United States Patent [19]
Holm

[11] Patent Number: 5,585,604
[45] Date of Patent: Dec. 17, 1996

[54] DYNAMIC WEIGHING METHOD OF DETERMINING A LOAD MEASURMENT VALUE AND THE RESOLUTION THEREOF

[75] Inventor: Lauri Holm, Lidingo, Sweden

[73] Assignee: Frontec Lulea AB, Pajala, Sweden

[21] Appl. No.: 157,082

[22] PCT Filed: May 18, 1992

[86] PCT No.: PCT/SE92/00324
§ 371 Date: Dec. 3, 1993
§ 102(e) Date: Dec. 3, 1993

[87] PCT Pub. No.: WO92/21009
PCT Pub. Date: Nov. 26, 1992

[30] Foreign Application Priority Data

May 23, 1991 [SE] Sweden .................................. 9101569

[51] Int. Cl.⁶ ............................................... G01G 19/02
[52] U.S. Cl. ........................... 177/133; 177/1; 177/25.13
[58] Field of Search ................................... 177/25.13, 50, 177/133, 1; 364/567

[56] References Cited

U.S. PATENT DOCUMENTS 3,446,299  5/1969  Leonowicz .............................. 177/136
5,300,736  4/1994  Ehrhardt .................................. 177/145

*Primary Examiner*—Brian W. Brown
*Assistant Examiner*—Randy W. Gibson
*Attorney, Agent, or Firm*—Christie, Parker & Hale, LLP

[57] ABSTRACT

A method of determining a load measurement value in dynamic weighing of an object passing over a weighing platform supported by load-sensing means generating a load-dependent weighing signal (S) which rises from a basic level to a peak level, to subsequently fall to the basic level. An at least approximative signal peak value ($S_{peak}$) is determined as representing the weighed load. The weighing signal is integrated at least during a time interval ($t_1-t_5$) about the point where the signal peak value is determined in order to produce a summation result, the time interval being recorded as a measurement time factor (M). Further, a form factor (F) for the weighing signal is calculated in the form of the ratio of the summation result, i.e., the integrated area under the weighing signal (S) for the time interval ($t_1-t_5$), to a corresponding rectangular area that would be obtained in static weighing, i.e., the product of a peak value and the above time interval. Finally, the load measurement value is determined as the above-signal peak value with a resolution depending on a quality factor $Q=F \cdot M \cdot k$, wherein k is a factor chosen while taking into consideration the weighing conditions.

12 Claims, 3 Drawing Sheets

DYNAMIC WEIGHING METHOD OF DETERMINING A LOAD MEASURMENT VALUE AND THE RESOLUTION THEREOF

TECHNICAL FIELD

The present invention relates to a method of determining a load measurement value in dynamic weighing, wherein an object to be weighed passes, while in motion, over a weighing platform supported by load-sensing means which then generates a load-dependent weighing signal which rises from a basic level to a peak level to subsequently fall to the basic level, which corresponds to the object moving onto the weighing platform, being situated in its entirety on the weighing platform, and moving out from the weighing platform, said method comprising the step of determining an at least approximative signal peak value as representing the weighed load. The invention is especially applicable to dynamic weighing of vehicles travelling at a high speed, e.g., in traffic controls.

TECHNICAL BACKGROUND

When weighing a vehicle or other object moving over a weighing platform, it is extremely difficult to obtain reproducible and accurate measurement values. This difficulty is especially pronounced in traffic controls on roads with very high maximum speed limits, e.g., motorways and the like, and where different sorts of vehicles are to be found, ranging from light private cars to heavy lorries. Tests have shown that the analog weighing signal then becomes very irregular, involving sudden, strong signal variations conditioned, e.g., by vibrations of the wheels, movements of the wheel suspensions, stones or the like struck in the tire tread, and so forth.

OBJECTS OF THE INVENTION

One object of the present invention is to improve the above method to enable the load measurement value to be determined with improved accuracy and with a resolution reflecting the actual quality of the measuring operation.

Another object of the invention is to provide such a method, which also permits the velocity of the object passing over the weighing platform to be determined in an advantageous manner and without any special separate velocity-measuring equipment, as has previously been required.

A further object of the invention is to provide such a method, which also is well-suited for low-velocity weighing.

SUMMARY OF THE INVENTION

According to the invention, these objects are achieved by a method having the distinctive features recited in the appended claims.

Thus, the method according to the invention is essentially characterised by integrating the weighing signal, at least during a time interval about the point where the signal peak value is determined, in order to produce a summation result, said time interval being recorded as a measurement time factor M; calculating a form factor F for the weighing signal in the form of the ratio of the summation result, i.e., the integrated area under the weighing signal for said time interval, to a corresponding rectangular area that would be obtained in static weighing, i.e., the product of a peak value and said time interval; and determining the load measurement value as said at least approximative signal peak value with a resolution depending on the form factor F and the measurement time factor M. The latter is preferably done by taking into account a quality factor $$Q = F \cdot M \cdot k,$$

wherein k is a factor chosen while taking into consideration the weighing conditions. The better the quality factor is, the more figures can be included in the load measurement value, i.e., resolution can be increased.

The form factor F will be a measure of the quality of the obtained signal compared with the result of static weighing of the same mass. It will be appreciated that the form factor is affected by the signal course, regardless of whether the weighing takes place at high or low velocity, although the likelihood of signal disturbances naturally is much greater when the velocity is very high.

Given the above definition of the form factor (the inverted ratio may also be used), the form factor will at best be 1, and this number will decrease as the form factor deteriorates.

The measurement time factor M is a measure of the velocity of the object moving over the weighing platform. This factor will not, however, indicate the velocity with exactitude, since the length of the pressure surface of the object against the weighing platform is not known.

A high measurement time factor indicates that it takes a long time for an object to move over the weighing platform, i.e., that the velocity is low, and vice versa.

According to the invention, F and M can now be weighed to give an indication of the weighing quality.

A high form factor F and a high measurement time factor M indicate that the conditions are optimal, resulting in the highest resolution.

A low form factor F and a low measurement time factor M indicate a poor signal curve and a very high velocity, i.e., the poorest conditions, resulting in the lowest resolution or even a rejection of the measurement value.

As will be appreciated, there are many combinations therebetween, obviously resulting in varying degrees of resolution. Generally speaking, a high form factor F may under some conditions compensate for a low measurement time factor, and vice versa.

Conveniently, the factor k is chosen empirically, and it has been found that this choice should especially be influenced by the measured peak value S (i.e., depending on whether the load is light or heavy) and the actual velocity V of the object moving over the weighing platform. In a preferred embodiment of the method according to the invention, the following formula applies $$Q = F \cdot M \cdot k(S, V).$$

As will be apparent further on, the method according to the invention enables the velocity V to be determined in a relatively simple way.

The fact that the weighing signal, according to the invention, is integrated, has been found to be of great significance, in that brief signal variations, such as spikes and the like, (e.g., generated by a stone stuck in a tire tread) have but a small impact on the measuring result. As a rule, such signal disturbances only result in small integrated areas. In addition, they often cancel each other out to a great extent, since an upwardly directed spike is generally followed by a downwardly directed spike, or the other way a round.

It has been found suitable to generate a weighing signal having a pulse frequency proportional to the weighed load in order to enable simpler signal processing. For this purpose, use can be made of an analog-frequency converter. Integration of the weighing signal is then easily performed by counting the pulses of the weighing signal.

According to the invention, it has proved advantageous to integrate the weighing signal during a number of successive part time intervals, each part integration yielding a part result easy to store. Typically, a part time interval has a duration of about 4–5 milliseconds. Since each part result is an integrated value, the part results will be comparatively accurate and correct, also when the signal curve is not even, but exhibits variations, spikes, and so forth. Further, it will be appreciated that the number of values that have to be stored for the signal curve in order to record its general course in a reliable manner, thus is drastically reduced, compared with continuous storage of the amplitude of the signal curve. In addition, such continuous storage would result in unreliable recordings, owing to the unevenness of the signal curve.

When integration is performed during part time intervals as above, the measurement time factor M can be easily determined as the number of part time intervals during which integration has taken place.

If the object thus passes over the weighing platform at a very low velocity, the number of part time intervals will obviously be very large. Thus, the weighing signal will be at its peak value during a large number of part time intervals.

In this case, i.e., when the number of part time intervals exceeds a predetermined value, it is possible within the scope of the invention to integrate the weighing signal only during a certain fixed number of successive part time intervals occurring about the peak value of the weighing signal. It will be appreciated that the form factor will then be close to 1, i.e., be at a value corresponding to that which would be the result of static, ideal weighing.

Conveniently, a peak value of the weighing signal is determined as a maximum part result or a part result obtained in the integration during a certain part time interval, or alternatively as the mean value of a number of part results lying about the maximum part result obtained or a certain part Time interval mentioned above. The latter may, e.g., be the part time interval in the middle of the part time intervals during which integration has taken place. Of course, this requires that the part results for The weighing signal be stored, at least until the required calculations have been performed.

As will be appreciated, the determined peak value can be used both as the at least approximative signal peak value mentioned above and as a peak value for the calculation of the form factor.

As mentioned earlier, the velocity of the object moving over the weighing platform can be determined according to the invention. This is done by fixing the point of time when the pressure surface of the object against the weighing platform is halfway onto the platform, as well as the point of time when the pressure surface of the object is halfway out of the weighing platform; calculating the Time elapsing between these two points of time; and calculating, on the basis of the calculated time and the known length of the weighing platform in the direction of travel, the velocity V of the object when passing over the weighing platform. Advantageously, these points of time are determined as the part time interval during the rise of the weighing signal towards the peak level during which the integrated part result is half a later occuring peak value, especially the later occurring integrated peak value part result, or alternatively the mean value of a number of part results around the peak value part result as well as the part Time interval during the fall of the weighing signal towards the basic level during which the integrated part result again is half the peak value mentioned above. Naturally, this requires that the integrated part results be stored at least until the two points of time have been established.

To optimise the signal course, it may be advantageous, before and after passage of the object over the weighing platform, to stabilise the movement of the object in vibration-dampening fashion by letting it pass over separate stabilising platforms on a level with and adjacent to the weighing platform.

An embodiment of the invention will be described in more detail below with reference to the accompanying drawings.

DESCRIPTION OF AN EMBODIMENT

Figure 1:
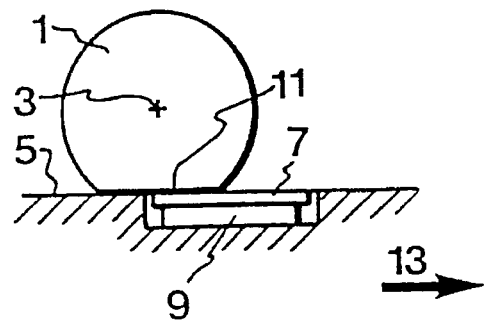
FIG. 1 is a schematic side view showing a vehicle wheel halfway onto a weighing platform forming part of a weighing unit disposed in a roadway.
Figure 2:
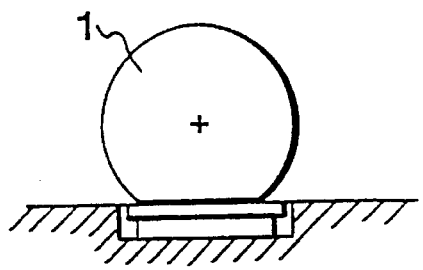
FIG. 2 is a schematic side view showing the vehicle wheel having entered in-its entirety the weighing platform.
Figure 3:
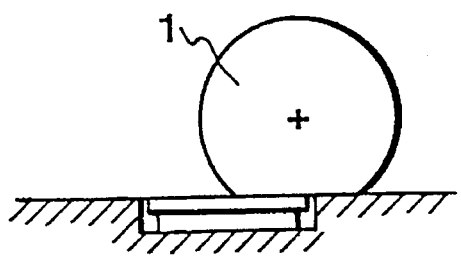
FIG. 3 is a schematic side view showing the vehicle wheel halfway out of the weighing platform.

FIGS. 1–3 schematically illustrate a vehicle wheel 1 with an axle 3 passing over a weighing unit disposed in a roadway 5 and including a weighing platform 7. The weighing platform 7, which is supported by sensor means 9, is arranged horizontally on a level with and adjacent to the roadway, so that the wheel 1 can roll onto the upper surface of the platform 7 as smoothly as possible. The pressure surface 11 of the wheel against the roadway and the weighing platform is smaller than the extent of the weighing platform 7 in the direction of travel, indicated by an arrow 13. In the embodiment shown, the extent of the weighing platform is but slightly larger than the maximum expected length of the pressure surface.

Figure 7:
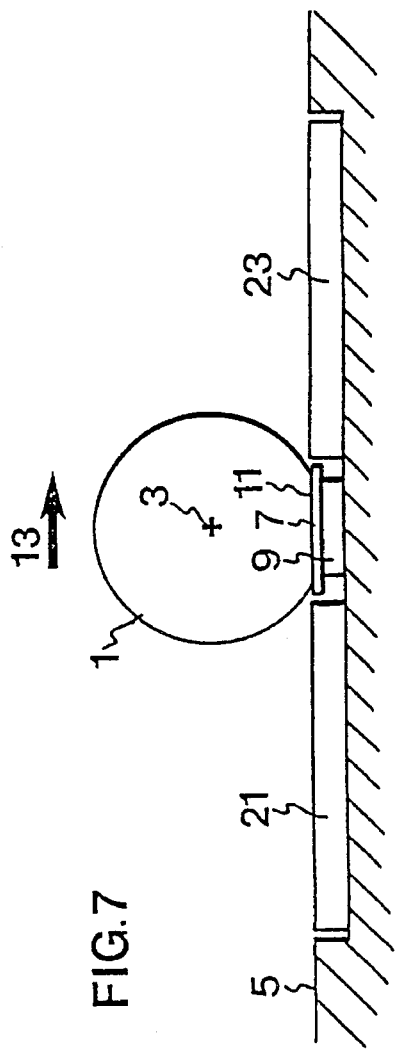
FIG. 7 is a schematic side view similar to FIG. 2 and illustrating a modified arrangement of the weighing unit.

FIG. 7 illustrates an alternative arrangement of the weighing equipment disposed in the roadway 5. Stabilising platforms 21 and 23, also mounted in the roadway 5, are provided before and after, respectively, the weighing unit. The weighing platform 7 is horizontally arranged with its upper surface on a level with the upper surfaces of the stabilising platforms 21, 23 and the roadway 5. The adjacency of the weighing platform to the stabilising platforms enables the wheel to roll onto and out from the weighing platform as smoothly as possible.

The stabilising platforms 21, 23 are designed to dampen vibrations, for which reason their length in the direction of travel is not a multiple of the length of the weighing platform 7. Typically, the stabilising platforms have a length which is about 1.5 or about 2.5 times the length of the weighing platform.

The weighing unit 7, 9 as well as the stabilising platforms 21, 23 might be arranged on a special base structure embedded in the roadway and having a certain flexibility, e.g., by being made of wood, thereby further reducing the risk of undesirable vibrations.

Figure 4:
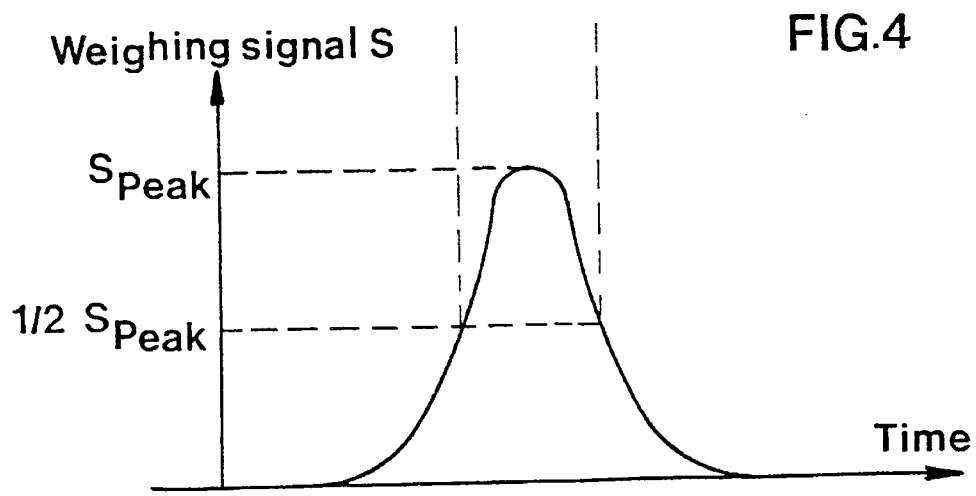
FIG. 4 is a schematic graph illustrating the ideal course of the weighing signal for the passage of the vehicle wheel over the weighing platform.
Figure 5:
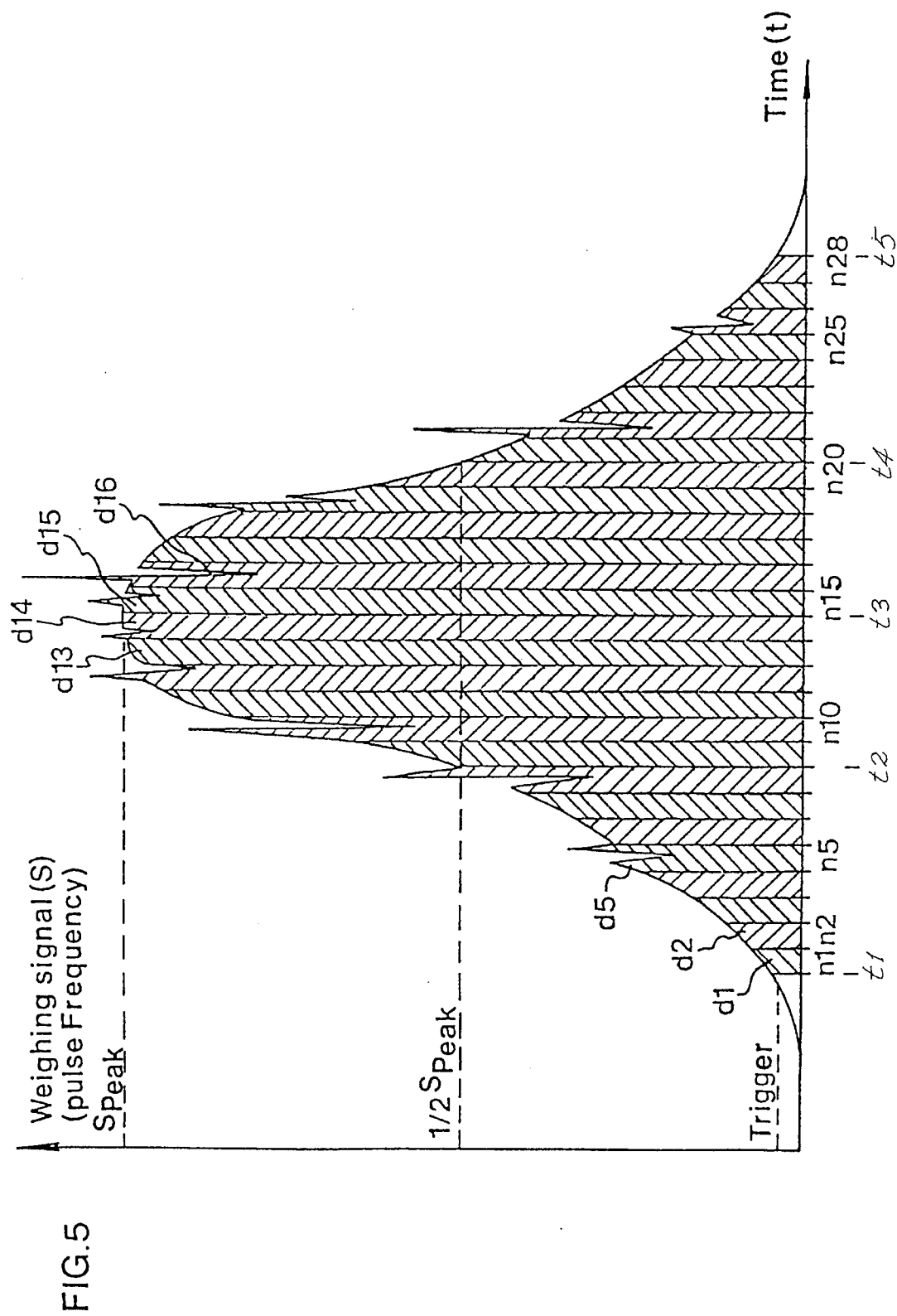
FIG. 5 is an enlarged schematic graph illustrating a typical course of the weighing signal including disturbances, and further illustrating the integration of the part time intervals according to the invention.

FIG. 4 schematically illustrates a weighing signal S that may be expected from the sensor means 9 under favourable conditions, the signal course shown being related to FIGS. 1–3.

In FIG. 1, the wheel 1 is halfway onto the weighing platform 7, i.e., its axle 3 is situated substantially above the left edge of the platform. At this stage, the weighing signal may be expected to have risen to half its peak value, the weighing platform supporting half the load.

In FIG. 2, the entire wheel has entered in its entirety the platform 7 and is supported thereby in centred manner. At this stage, the weighing signal is at its peak value, representing the total load.

In FIG. 3, the wheel is halfway out of the platform, and the signal may thus be expected to have fallen to half the peak value.

The analog weighing signal derived from the sensor means 9 is converted in an analog-frequency converter (AFC) to a pulse signal whose frequency is proportional to the amplitude of the signal from the sensor means, i.e., to the sensed load.

The pulse weighing signal will exhibit different disturbances in the form of irregularities like sudden leaps taking on the nature of spikes. A leap in one direction is, as a rule, succeeded by a leap in the opposite direction. Although the leap amplitude may be very large, the alterations in the area under the signal curve are comparatively insignificant. According to the invention, this fact is used for minimising the effect of the disturbances. To this end, use is made of an integration procedure.

As soon as the weighing signal has passed a chosen trigger level, at the point of time $t_1$, an integration procedure is begun during successive part time intervals $n_1, n_2 \ldots$ of predetermined duration, e.g., 4.5 ms. The integration result for each part time interval constitutes a part result $d_1, d_2$, etc. corresponding to the area under the signal for the part time interval at issue. It will be appreciated that signal disturbances, such as during the part time interval $n_5$, will be substantially filtered out by the integration procedure.

The result of each part integration, i.e., the part result, is temporarily stored in a memory. The part integration continues until the weighing signal has fallen to the trigger level, which, in the Example shown, happens after 28 part integrations.

Figure 6:
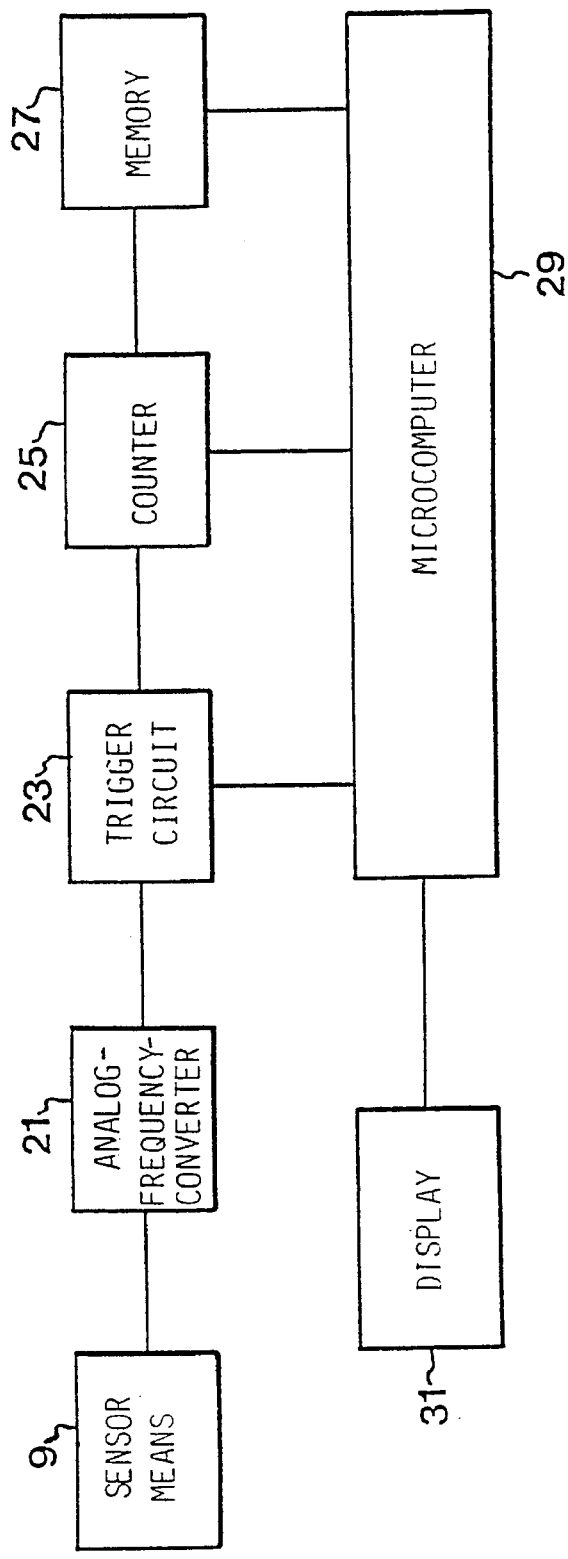
FIG. 6 is a schematic block diagram illustrating an example of a circuit for displaying a load measurement value on the basis of a sensor signal.

All the desired calculations can now be performed on the basis of the temporarily stored part results by means of a microcomputer-controlled circuit whose general structure is illustrated in FIG. 6.

As appears from FIG. 6, the sensor means 9 feeds an analog-frequency converter 21 whose output signal is sensed by a trigger circuit 23. When the output signal rises above a chosen level, the trigger circuit lets through the output signal to a counter 25. The latter counts the number of pulses during each part time interval, and the part results are stored in a memory 27. These operations are controlled by a microcomputer 29 which is connected to the blocks 23, 25 and 27 and which in addition feeds a display 31.

The microcomputer 29 is programmed to perform the following functions:

1. Counting the number of part time intervals during which integration has taken place, in this Example 28 intervals. This number is the measurement time factor M.
2. Determining the mean value of a fixed number (e.g., four) of stored part results around the middle part time interval (at $t_3$). In the Example, the mean value is determined on the basis of the part results $d_{13}, d_{14}, d_{15}$ and $d_{16}$. The mean value is the peak value on which the load measurement value and the form-factor calculation are to be based.
3. Determining the sum of the stored part results form a summation result.
4. Establishing the product of the peak value and the number of counted part time intervals.
5. Calculating the form factor F as the ratio of the summation result to the above product.
6. Determining the part time interval when the part result has risen to half the calculated peak value, in this case $n_8$ at $t_2$.
7. Determining the part time interval when the part result has fallen to half the calculated peak value, in this case $n_{20}$ at $t_4$.
8. Determining the number of part time intervals between $t_2$ and $t_4$, in this case twelve, and calculating the velocity V of the wheel 1 on the basis of this information and the stored information on the length of the weighing platform in the direction of travel.
9. Choosing the value of the factor k on the basis of programmed rules while taking into consideration the fixed signal peak mean value and the calculated velocity.
10. Calculating the quality factor $Q=F \cdot M \cdot k$.
11. Indicating a load measurement value on the display 31 in the form of the fixed peak mean value with a resolution determined by the quality factor Q in accordance with programmed rules.

If desired, the load measurement value displayed may easily be recorded on a recording medium (not shown).

Since the number of part results to be stored is comparatively small and the required calculations are fairly simple, no advanced computer equipment is needed. In addition, the entire signal processing up to the display of the load measurement value takes but a short time, and the equipment is thus soon ready to perform a new measuring operation. Of course, this is of importance when controlling rapid and heavy traffic.

I claim:

1. A dynamic weighing method for determining a load measurement value, wherein an object to be weighed is passed over a weighing platform supported by load-sensing means, said load-sensing means generating a load dependent weighing signal representative of a first value which rises to a peak value and then falls back to the first value corresponding to the object moving onto the weighing platform, being situated in its entirety on the weighing platform, and moving out from the weighing platform, said method comprising the steps of:

computing a first approximation of the peak value from the weighing signal;

determining the load measurement value as a function of the first approximation of the peak value;

integrating at least a portion of the weighing signal over a time interval about the peak value;

calculating a weighing signal form factor as a function of the ratio of the integrated portion of the weighing signal and the product of a second approximation of the peak value and the time interval; and wherein said load measurement value comprises a resolution corresponding to a quality factor, said quality factor being a function of the product of the form factor and the time interval.

2. The method of claim 1 wherein the integrating step comprises the step of integrating successive parts of the time interval, said time interval being determined by the number of parts integrated.

3. The method of claim 2 wherein the integrating step comprises the step of integrating successive parts of a portion of the time interval when said parts of the time interval exceed a predetermined number.

4. The method of claim 2 wherein the second approximation of the peak value is computed as a function of at least one integrated part of the time interval.

5. The method of claim 4 wherein the first approximation of the peak value is computed by using the second approximation of the peak value.

6. The method of claim 5 wherein the quality factor is a function of a k factor, said k factor being computed as a function of the peak value.

7. The method of claims 2, or 5 further comprising the steps of determining a second time interval corresponding to a second portion of the weighing signal, said second portion being defined by the portion of the weighing signal having a value exceeding approximately one-half the peak value, and calculating the velocity of the object passing over the weighing platform as a function of the second time interval and a length of the weighing platform.

8. The method of claim 7 wherein the step of determining the second time interval is computed from an integrated part on a rising portion of the weighing signal which is substantially equal to one-half the peak value.

9. The method of claim 8 further comprising the step of storing the integrated parts on the rising portion of the weighing signal at least until the second time portion has been determined.

10. The method of claim 7 wherein the quality factor is a function of a k factor, said k factor being computed as a function of the velocity.

11. The method of claim 1 wherein the weighing signal comprises a pulse frequency proportional to the load on the weighing platform.

12. The method of claim 11 wherein the integrating step comprises the step of counting the pulses.

\* \* \* \* \*